March 22, 1966    J. R. TIMBERLAKE ET AL    3,241,478
WIRE HOLDER AND RELEASE FOR WIRE TWISTER FOR BALERS
Original Filed Dec. 4, 1961    5 Sheets-Sheet 1

INVENTOR:
John R. Timberlake
Harvey O. Halstensgard
Arlie J. Thayer
Ralph Alvey
ATTORNEY

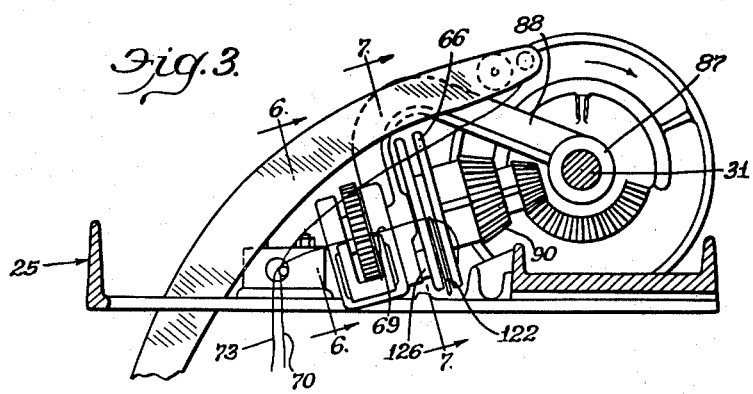
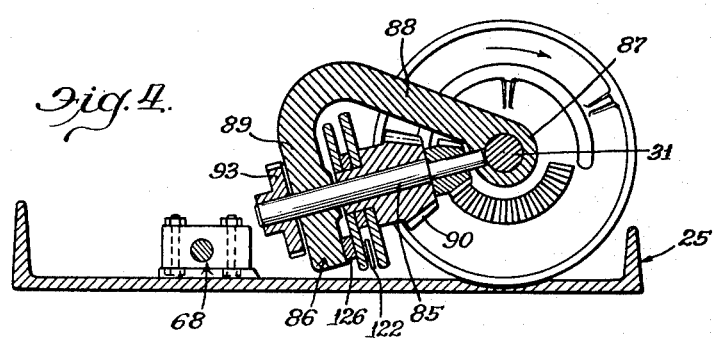
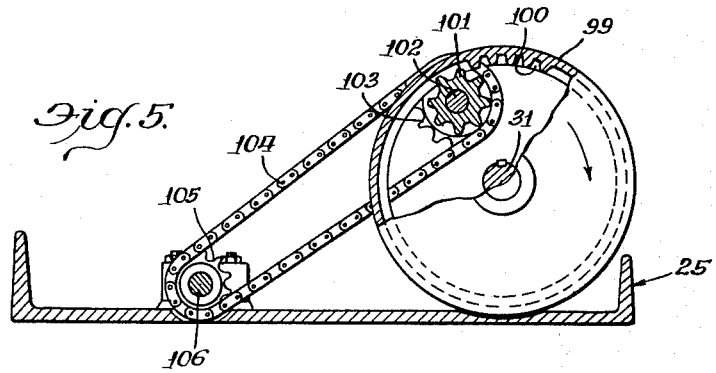

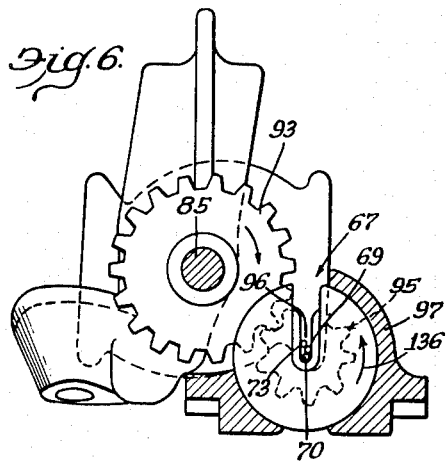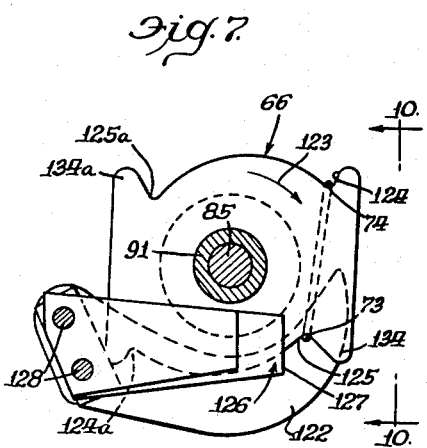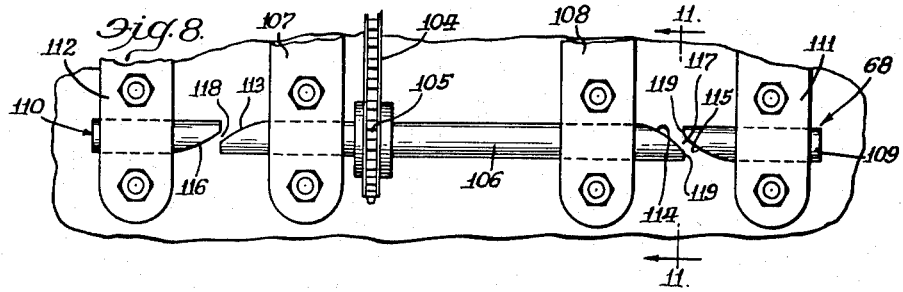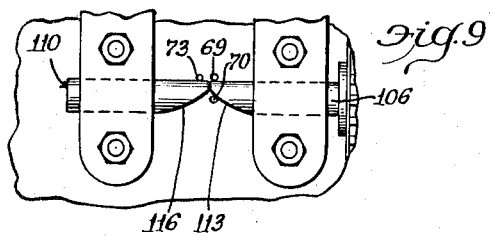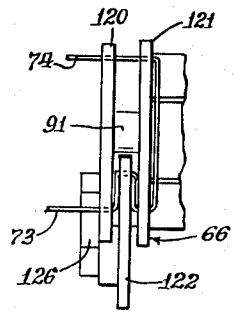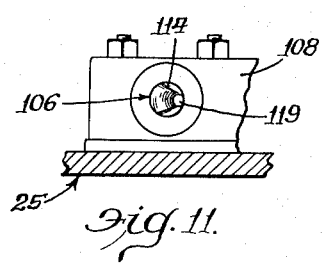

March 22, 1966     J. R. TIMBERLAKE ET AL     3,241,478
WIRE HOLDER AND RELEASE FOR WIRE TWISTER FOR BALERS
Original Filed Dec. 4, 1961     5 Sheets-Sheet 4
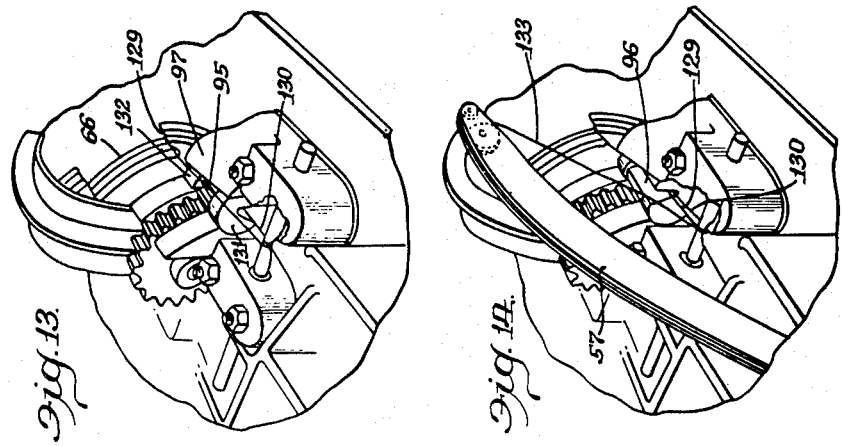
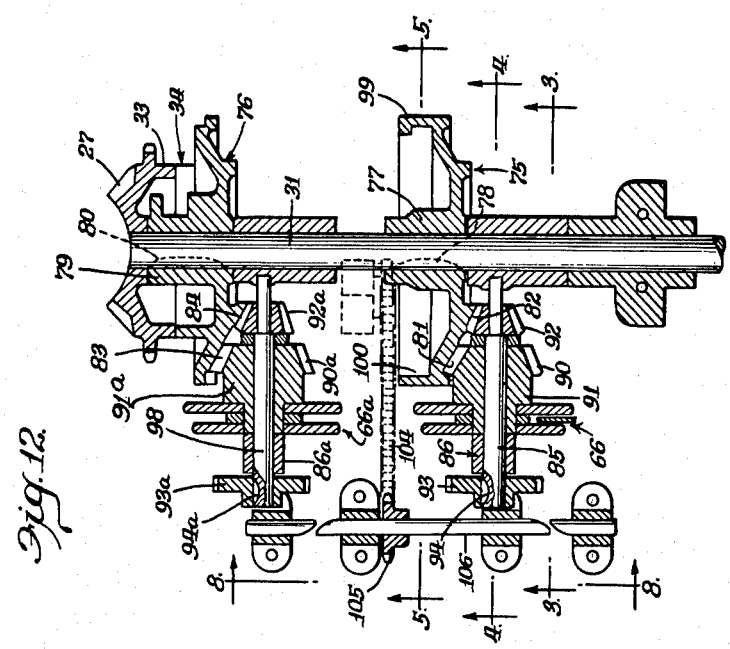
INVENTOR:
John R. Timberlake
Harvey O. Halstensgard
Arlie J. Thayer
Ralph Alvey
ATTORNEY March 22, 1966 J. R. TIMBERLAKE ET AL 3,241,478
WIRE HOLDER AND RELEASE FOR WIRE TWISTER FOR BALERS
Original Filed Dec. 4, 1961 5 Sheets-Sheet 4
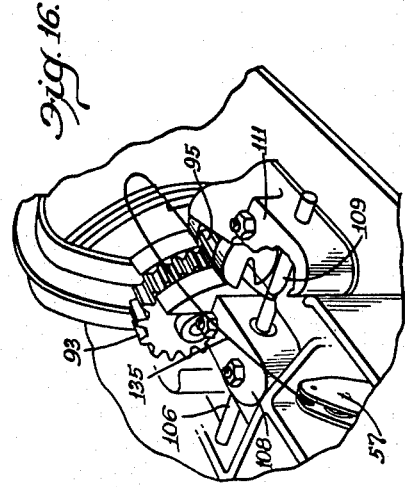
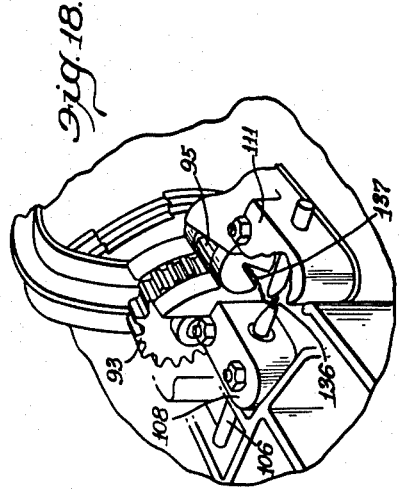
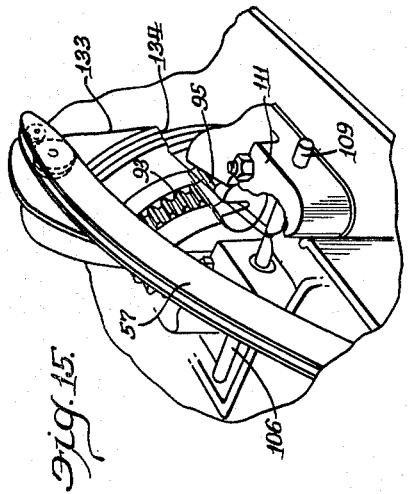
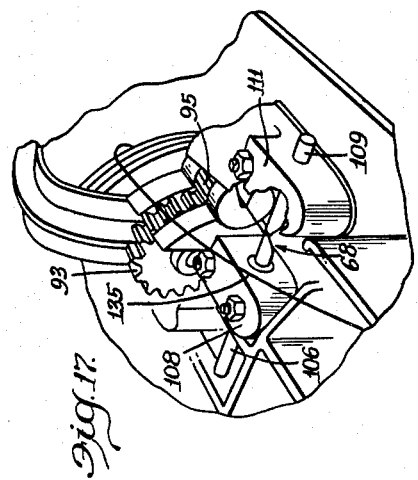
INVENTOR.
John R. Timberlake
Harvey O. Halstensgard
Arlie J. Thayer
Ralph Alvey
ATTORNEY

United States Patent Office 3,241,478
Patented Mar. 22, 1966

3,241,478
WIRE HOLDER AND RELEASE FOR WIRE TWISTER FOR BALERS
John R. Timberlake, Downers Grove, and Harvey O. Halstensgard and Arlie J. Thayer, Brookfield, Ill., assignors to International Harvester Company, Chicago, Ill., a corporation of New Jersey
Original application Dec. 4, 1961, Ser. No. 156,842, now Patent No. 3,167,001, dated Jan. 26, 1965. Divided and this application Nov. 16, 1964, Ser. No. 411,647
4 Claims. (Cl. 100—21)

This invention is a division of our copending U.S. patent application No. 156,842 filed December 4, 1961, now U.S. Patent No. 3,167,001.

This invention relates to a new and improved wire holder and releaser for wire twisters for balers.

The present invention is directed to an improvement in the type of wire twister for balers as shown in the Patrick L. May U.S. Patent No. 2,897,747.

In a three strand inline wire twist in which two of the strands have a closed end loop, there is always the problem of removing the closed end loop from the twisting mechanism. A further problem in such twisters is to provide means for holding a newly inserted wire out of proximity of the twist then being made.

It is thus a principal object of this invention to provide a wire holder and releaser mechanism for holding and then removing a looped end of an inline wire twist.

An important object of this invention is the provision of means for producing an inline wire twist having a loop at one end of the twist and providing means for removing the looped end of the twist upon the completion of the twist and at the same time to control and position a newly inserted wire for the formation of a succeeding wire twist.

Another important object of this invention is to provide cooperative elements in substantially abutting relationship to retain a looped wire strand and means moving at least one of said elements to permit the looped wire to pass outwardly between the spaced apart cooperative elements.

Still another important object of this invention is to equip a wire holder and releaser with movable means that in one position retains a looped wire and in a transversely moved position permits removal of the looped wire.

Another important object of this invention is the provision of means to transversely space one of the cooperative wire holding elements to thereby release the previously held wire.

Still another important object of this invention is to supply a mechanism for inline wire twisters employing substantially end abutting aligned shafts about which the loop in the end of the twist may be initially formed and means on the ends of the shafts upon rotation thereof for permitting withdrawal of the formed loop therefrom.

A still further important object of this invention is to equip end abutting aligned shafts with tapered ends such that rotation of one shaft relative to the other places the tapered ends in a position for holding a looped end of a wire twist thereon or in a position for effecting the release and withdrawal of the looped end of the wire twist.

Other and further important objects and advantages will become apparent from the disclosures in the following specification and accompanying drawings.

In the drawings:
FIGURE 1 is a top plan view of a portion of a hay baler incorporating the wire holding and releasing mechanism of this invention.

FIGURE 3 is a sectional view of a portion of the wire twisting mechanism of this invention taken on the line 3—3 of FIGURE 12.

FIGURE 4 is a sectional view taken on the line 4—4 of FIGURE 12.

FIGURE 5 is a sectional view taken on the line 5—5 of FIGURE 12.

FIGURE 6 is a sectional view taken on the line 6—6 of FIGURE 3 and is of slightly larger scale.

FIGURE 7 is a sectional view taken on the line 7—7 of FIGURE 3 and is also enlarged.

FIGURE 8 is an enlarged top plan view of the wire holding and releasing mechanism of this invention.

FIGURE 9 shows a portion of the device of FIGURE 8 with one of the end abutting shafts rotated relative to the other shaft.

FIGURE 10 is a detail side view taken on the line 10—10 of FIGURE 7.

FIGURE 11 is a sectional view taken on the line 11—11 of FIGURE 8.

FIGURE 12 is a sectional view taken on the line 12—12 of FIGURE 2.

FIGURES 13 through 18 show perspective views of the wire twisting and wire holding and releasing mechanism in successive stages of making the wire twist and effecting removal of the wire twist therefrom.

Description

Figure 1:
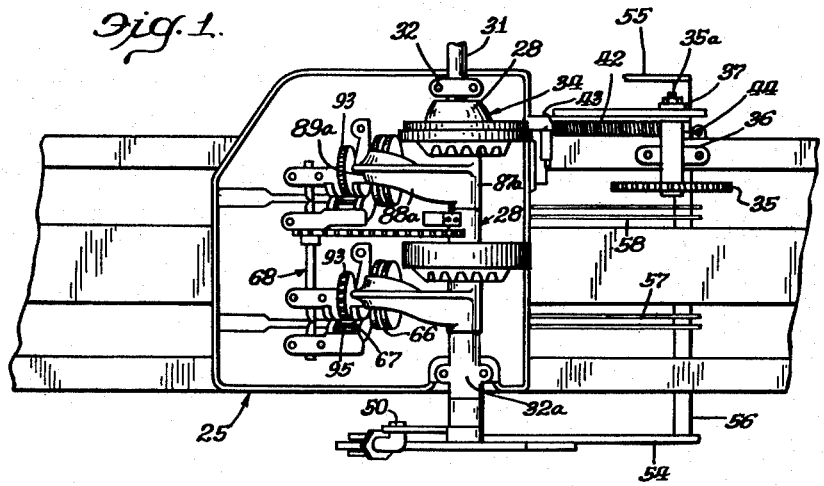

The reference numeral 20 indicates generally a bale forming chamber on which the wire twister of this invention apart bearings 32 and 32a. The clutch housing 28 forms releasing means. A reciprocating plunger 21 moves longitudinally within the bale forming chamber 20 and acts to compress hay therewithin to form bales. The baler of this invention is of the type shown in the Crumb et al. U.S. Patent No. 2,450,082. A constantly driven clutch housing is mounted on the top of the bale forming chamber 20 and imparts rotational drive to the wire twisting mechanism of this invention.

The driven clutch housing 28 is provided with a centrally disposed shaft 31 journally carried within spaced apart bearing 32 and 32a. The clutch housing 28 forms a part of a single revolution clutch 34 which acts to impart drive to the wire twisting mechanisms as will hereafter be described. The clutch 34 is similar in operation and structure to a corresponding clutch shown in the U.S. Patent No. 2,654,840 to Bornzin. The clutch housing 28 of the clutch 34 rotates constantly as long as the hay baler is operating. It is the function of the clutch 34 and an operating means therefor to intermittently cause a driving of the internal shaft 31 on which is mounted the wire twisting mechanisms.

Figure 2:
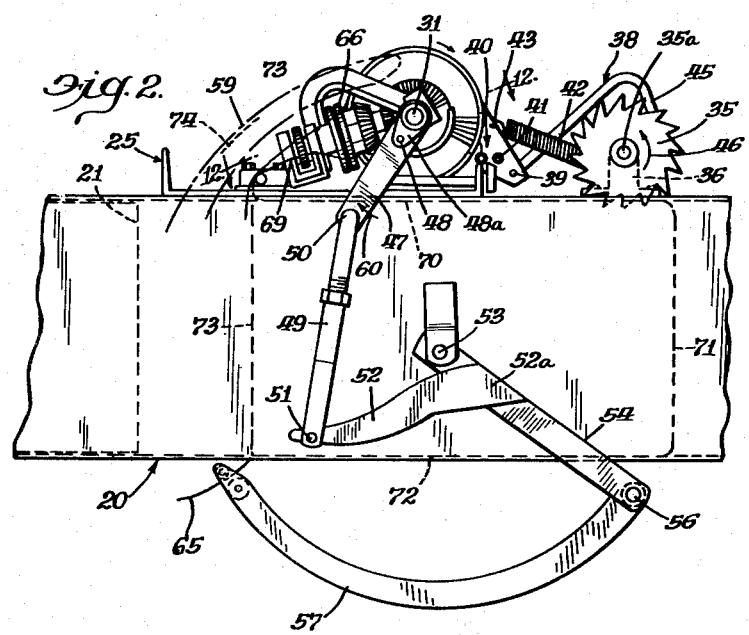
FIGURE 2 is a side elevational view of a portion of the baler as shown in FIGURE 1.

A bale length metering wheel 35, as shown in FIGURES 1 and 2, has hay penetrating teeth of the saw tooth type around its periphery, which are adapted to engage the top surface of the hay being formed into bales within the bale forming chamber 20. The movement of the baled hay imparts rotational movement to the metering wheel 35. The metering wheel determines the length of the bale by actuating the wire twisters upon the completion of its formation. The metering wheel 35 has a central shaft 35a which is carried in a bearing support 36 on the bale chamber 20. A pulley or sheave 37 is mounted on the end of the shaft 35a opposite the metering wheel 35. Thus, as the metering wheel 35 rotates by engagement with the hay moving therethrough rotational movement is imparted to the pulley 37. An actuating arm 38 arranged and constructed to engage the sheave 37 is pivoted at 39 on a clutch trip arm 40. The clutch trip arm 40 is pivoted at 41 on the frame structure 25. A spring 42 is fastened at one end at 43 to the trip arm 40 and at its other end at 44 to the stationary bale chamber 20. The spring 42 thus normally urges the trip arm 40 toward a clockwise rotation. The details of the clutch have not been further amplified in this application because of the prior disclosures in the Bornzin U.S. Patent No. 2,634,840 and the May U.S. Patent No. 2,897,747.

As shown in FIGURE 2 the actuating arm 33 has a downwardly bent portion 45 which is adapted to engage the V-notch of the sheave 37. By reason of the spring 42 the bent end portion 45 is pulled into the V-pulley 37. Rotation of the metering wheel 35 in the direction of rotation as indicated by arrow 46 causes a similar rotation of the sheave 37 and an upward movement of the bent end 45 of the actuating arm 38. The clutch trip arm 40 may not operate until the lower edge of the bent end 45 of the actuating arm 38 rides over the top of the sheave 37, thus permitting the spring 42 to pull outwardly on the clutch trip arm 40 to thereupon effect rotation of the wire twisting mechanism.

A crank arm 47 is fastened to the shaft 31 by means of a pin 48 and shaft collar 48a. An adjustable length connecting link 49 is pivotally attached to the outer end of the crank arm at 50. The other end of the adjustable length connecting link 49 is pivotally attached at 51 to a second crank arm 52 which is best shown in FIGURE 2. Generally parallel arms 54 and 55 are attached to each side of the bale forming chamber 20 by axially aligned stub shafts constituting a hinge 53. The outer ends of the arms 54 and 55 carry a transverse rod 56. Drive is imparted to the arms 54 and 55 by the attachment of the second crank arm 52 to the arm 54 at 52a. The rod 56 supports spaced apart wire carrying needles 57 and 58 intermediate its ends. The strand carrying needles 57 and 58 are adapted to move upwardly through the bale forming chamber 20 to the dash line position as shown at 59 in FIGURE 2 whenever the trip mechanism causes the shaft 31 to rotate. The crank arm 47 makes a full revolution in the direction of the arrow 60 thus causing the link arm 49 to move the crank arm 52 and the wire carrying needles 57 and 58 upwardly through the bale forming chamber 20. The needles lay the wire strands over the wire twisting mechanisms to be subsequently described.

A source of wire supply provides a wire strand 65 as shown in FIGURE 2, which is picked up by the needle 57 and carried upwardly in a looped manner with the needle to the wire twisting mechanisms. A wire strand from a previous twist is held in the holder 66 and passes forwardly over twister elements 67 and over end abutting aligned shaft means 68, which constitute the wire holding and releasing means of this invention. A new wire strand carried up by the needle 57 is laid across these same elements and joins with the strand from the previous twist preliminary to making an inline twist.

The wire strand 65 coming from the source of supply is gripped at its end by the wire holder 66, whereupon it extends forwardly over the wire holder and releasing mechanism which, as shown in the device illustrated in FIGURES 1 through 18, consists of end abutting aligned shafts 68. This portion of the strand shall for convenience be designated by the numeral 69. From here the strand extends rearwardly over the top of the bale, the numeral 70 identifying that portion of the bale encircling wire strand. A portion 71 of the strand comes down over the rear of the bale of hay and a portion 72 projects forwardly along the bottom of the bale. The wire carrying needles 57 and 58 carry a loop portion of the strand upwardly over the front end of the formed bale, which portion is designated by the numeral 73. The other portion 74 of the looped strand is on the top side of the needles 57 and 58. It is this portion of the bale encircling strand that becomes the rear of a succeeding bale. In other words, the looped portion carried by the needles is divided so that the one end completes the bale encircling strand of one bale and the other portion provides the beginning of the bale encircling strand for the next bale formed in the hay baler.

As best shown in FIGURE 12, the shaft 31, which is rotated when the clutch 34 is "in engagement," carries spaced apart enlarged ring members 75 and 76. The ring member 75 has a sleeve-like hub 77 which is keyed as shown at 78 to the shaft 31. Similarly the ring member 76 has a sleeve-like hub 79 which is keyed at 80 to the shaft 31. The ring member 75 has outer and inner intermittent or mutilated bevel gears 81 and 82. Similarly the ring member 76 has outer and inner intermittent or mutilated bevel gears 83 and 84.

A shaft 85 is disposed at right angles to the shaft 31 and is carried in a bearing support 86. As best shown in FIGURE 4, the bearing support 86 includes a sleeve-like or yoke bearing 87 which is journally mounted over the shaft 31. The bearing support 86 further includes an angularly disposed arm member 88 and a downwardly projecting bent end portion 89 to journally receive the shaft 85. The end of the shaft 85 is further journally supported in the yoke 87 as shown in FIGURES 4 and 12. A bevel gear 90 is journally supported on the shaft 85 and is in meshing engagement with the outer mutilated bevel gear 81 of the ring member 75. The bevel gear 90 is provided with a hub 91 which carries for rotation therewith the wire holding discs 66. A second bevel gear 92 is in engagement with the innermost mutilated bevel gear 82 of the ring member 75. The bevel gear 92 is affixed to the shaft 85 so that it imparts rotation thereto when the bevel gear 92 is in meshing engagement with teeth in the bevel gear 82 of the ring member 75. The other end of the shaft 85 has mounted thereon a spur gear 93 which is keyed or otherwise fastened at 94 to the shaft 85.

As best shown in FIGURE 6, the spur gear 93 is in meshing engagement with a split pinion 95 which is identified as a radially slotted gear. The split pinion 95 is the means for effecting the twist in the wire strands of this wire twisting mechanisms. The slotted gear 95 is equipped with a radially disposed slot 96. The slotted gear 95 is carried within a housing 97 which is generally fixedly mounted relative to the stationary supporting structure 25. It is within this slot 96 that the strand carried by the wire carrying needle is laid to be added to the wire twist.

As further shown in FIGURE 12 a second shaft 98, disposed parallel to the shaft 85 and spaced therefrom, is also disposed at right angles to the shaft 31. In the present situation where the elements on the shaft 98 correspond to the elements on the shaft 85 they will for convenience be identified merely by adding the suffix "a" to the numbers previously given to the elements for use in conjunction with the device of shaft 85. The shaft 98 is carried in a bearing support 86a which is similar to the bearing support 86 for the shaft 85. Similar to the device shown in FIGURE 4, the bearing support 86a includes a sleeve member 87a, an angularly extending arm 88a, and a downwardly bent end portion 89a which journally receives the shaft 98 in the same manner as the bearing support 86 receives the shaft 85. The end of the shaft 98 is further journaled in the yoke or sleeve 87a. A first bevel gear 90a is adapted to meshingly engage with the mutilated bevel gear 83 of the ring member 76. The bevel gear 90a has a hub 91a which engages with and is affixed to a wire holder 66a. A second bevel gear 92a is in meshing engagement with the mutilated bevel gear 84 of the ring member 76 and in turn is fastened to the shaft 98 for concurrent rotation therewith. At the outer end of the shaft 98 there is mounted thereon a spur gear 93a which by means of a key 94a is fastened to the shaft 98 and receives rotation therefrom. Spur gear 93a drives a split pinion in the same manner that spur gear 93 drives split pinion 95. This second wire twister has not been further shown in enlarged detail because an identical twister is displayed in FIGURE 6 and the two twisting units are shown in the top plan view of FIGURE 1.

As best shown in FIGURE 12, the ring member 75 differs from the ring member 76 in that there is included therein an outer annular axially extending flange 99 which has formed internally thereof mutilated gear teeth 100. As shown in FIGURE 5, a pinion gear 101 is mounted for meshing engagement with the internal mutilated ring gear 100. The gear 101 is mounted on a shaft 102, which is journally supported in adjustably fixed position relative to the stationary supporting structure 25 and carries a sprocket 103 on its outer end. A chain 104 is mounted on the sprocket 103 and extends downwardly and forwardly for engagement with a sprocket 105 mounted on and adapted to impart drive to a shaft 106, which constitutes a part of the end abutting aligned shafts designated generally by the numeral 68.

The transversely disposed shaft 106 is journally carried in spaced apart bearing members 107 and 108, as best shown in FIGURES 8, 9 and 12. The bearings 107 and 108 are carried on the supporting structure 25. Thus, as the chain 104 is driven through the engagement of the pinion gear 101 with the mutilated internal annular ring gear 100, rotation is imparted to the shaft 106. It is the particular positioning of the shaft 106 relative to the positioning of end abutting aligned shafts 109 and 110 that creates the wire holding and releasing mechanism of the present invention. The shaft 109 is mounted within a supporting bracket 111, and similarly the shaft 110 is mounted in a supporting bracket 112, all as shown in FIGURE 8. The supporting brackets 111 and 112 are similar in construction to the bearing supports 107 and 108, which carry the central shaft 106. However, the shaft 106 is rotated; whereas the stub shafts or end abutting aligned shafts 109 and 110 remain fixed once they are initially set. The junctures between the end abutting aligned shafts 106, 109 and 110 are generally in longitudinal alignment with the radial slots 96 in the split pinions and the strand catching means on the wire holder 66, as will subsequently be described.

The outer ends of the shaft 106 are beveled or tapered on one side thereof as shown at 113 and 114. The tapered ends are shown extending downwardly and outwardly toward the ends of the shaft 106. The taper is of such an extent that the remaining uncut portions of the shaft are less than half the diameter of the shaft, or, in other words, the taper extends radially inwardly at the ends of the shaft a distance in excess of the radius of the shaft. The end abutting aligned shafts 109 and 110 are also equipped with beveled or tapered inner ends 115 and 116 respectively. As shown in FIGURE 8, the relative positions of the tapers 114 and 115 provide an intermediately disposed space or diagonal passage 117 through which the looped end of wire strands may be slidably removed. Similarly the tapered ends 113 and 116 define an intermediately disposed diagonal passage 118 through which the wire twist loop may be removed. The amount of radial taper of each of the tapered ends 115 and 116 exceeds a radius of the shaft at the ends thereof. Thus, even though the adjoining ends of the shafts 106 and 109 are in effect end abutting and terminate in a common plane there is adequate room to effect removal of the looped end of the twisted wire strands through the diagonal passages 117 and 118 as shown in FIG. 8. The end abutting aligned shafts 106 and 109 with the ends rotated relative to each other as shown in FIGURE 9 effectively have the diagonal passages 117 and 118 closed by the small retained ends of the shafts being in aligned relationship. In the position of the device as shown in FIGURE 9, the wire carrying needles can pass a strand of wire over the end abutting aligned shafts 106 and 109 without any danger of that wire falling or passing down between the ends of the shafts 106 and 109. For purposes of a better understanding of the wire holding mechanism, the wire strand 65 and its portions 69, 70 and 73 have been positioned on the end abutting shafts in their holding position during the period of time when a twist is effected. Of course, following the rotation of the slotted gear 95 and the making of an intertwist of wire strands in the crotch of the open radial slot 96, the loop formed by the adjoining ends 69 and 70 and the strand 73 may be effectively stripped or allowed to strip from the wire holding mechanism 68 by a mere turning of the shaft 106 to the position as shown in FIGURE 8, whereupon the strands slip out through the diagonal spaces between the ends of the shafts. The taper or beveling of the shafts 106, 109 and 110 is illustrated in the end view of FIGURE 11, wherein the taper 114 has been shown. It should be understood that this showing is representative of all of the tapers and their construction. The retained portion 119 of the end of the shaft is considerably less in radial extent than a radius of the shaft 106. The home position of the shaft ends is a closed position thereof and the diagonal spaces only appear momentarily during operation. Immediately following opening of the shaft ends and the stripping of the wire, the shafts return to their closed, home position.

The wire holder 66 is illustrated more explicity in FIGURES 7 and 10. The holder includes spaced apart discs or plate members 120 and 121. The hub 91 of the bevel gear 90 passes centrally through the spaced discs 120 and 121 and the wire strands are held between the discs by means of a wire holding or keeper arm 122. The discs moving as a unit rotate in the direction of an arrow 123, as shown in FIGURE 7. The discs are provided with similar notches in their peripheries within which the wire strands may be laid, as will hereafter be defined. The notch in the upper right hand corner of the discs shown at 124 in FIGURE 7 is adapted to receive the end or substantially the end of the wire strand portion 73, which comes up on the lower side of the wire carrying needles 57 and 58. The notch 124 and a diametrically opposed identical notch 124a are of relatively shallow depth. Intermediate notches in the periphery of the discs 120 and 121 are shown at 125 and 125a, which are also diametrically opposed but in this instance are of substantially greater depth than the alternate diametrically opposed slots 124 and 124a. The needle wire 73 is forced behind the keeper blade 122 because, as the discs rotate, the needle wires pull away from the needle, putting the wire in tension and thereby forcing it to the bottom of notch 125. Due to the relation between notch 125 and the keeper blade 122, the wire is forced behind the keeper blade. The keeper blade is designed to release the tail wire just as the wire discs complete their first rotation. This permits the tail wire to render as the twist is being formed. FIGURE 10 generally depicts the strand 74 passing over identical notches 124 in the spaced apart plates 120 and 121, thence down the backside of one of the plates, thence forwardly through the space between the plates and under the keeper blade 122, and thence out forwardly as shown by the strand portion 73.

A wire knife 126 is shown in FIGURE 7 and 10 and is so positioned that the cutting edge 127 has an extent projecting generally radially from a position outside the central shaft 85 and continuing outwardly to a position beyond the depth of the deep notches 125 and 125a, but short of the shallow notches 124 and 124a. The configuration of the discs 120 and 121, which are equipped with identical notches and in exactly aligned relationship with respect to each other, makes it impossible to cut short, separate tail wires because of the relationship between the shallow notches at 124 and 124a, which support the tail wire and the keeper blade 122, which keeps the tail wire outside the cutting area of the wire knife 126. As further shown in FIGURE 7, the knife 126 is fastened by means of bolts 128 or the like to the stationary bearing support 86.

The wire twister for balers shown and described herein is the same in principle as the prior U.S. Patent No. 2,897,747 to P. L. May. It should be understood that the operation of the present device is the same as the May device, except for certain improvements in the wire holding mechanisms both in front of and behind the wire twister and in the wire cutoff mechanism. The wire twister of the present invention makes an identical twist, such as made by the previous May patent. In the general operation of the device of this invention the meter wheel 35 measures the bale length as the bale of hay is formed by reason of reciprocation of a plunger 21 causing hay to be compacted in a bale forming chamber 20. At some desired preset length of a bale being formed, the metering wheel 35 trips the single revolution clutch 34 which activates the twister shaft 31. The single revolution clutch is similar to the clutch used in the prior May patent. The wire has been placed in the slot 96 in the split pinion 95 by the formation of the bale to be tied. As the twister shaft 31 rotates the relatively large diameter ring members 75 and 76, which are keyed to the shaft, also rotate. At approximately 60° of rotation of the ring members 75 and 76, which may also be termed twister delay gears, the bevel gear 92, also termed a twister delay pinion, is rotated 90° by contacting a single tooth on the large bevel gear 82 of the ring member 75. The twister delay pinion 92 is pinned to the shaft 85 to which the twister drive gear 93 is keyed. The twister drive gear 93 is shown in meshing engagement with the split pinion 95 in FIGURE 6. It is preferable that the gear 93 drive the split pinion 95 at a 1–2 ratio. Therefore, the split pinion 95 has been rotated 180° causing the radial slot 96 therein to stop in an upwardly opening position as shown in FIGURE 6. The split pinion 95 remains in this position until the needle wire 73 is placed into the pinion slot by the holding discs 66. At approximately 120° of rotation of the twister delay gear 82, the wire holding drive pinion 90 starts to rotate. The holder 66 comprising the spaced plates or discs 120 and 121 and their shallow and deep notches 124 and 124a, and 125 and 125a, respectively, catch the needle wire at approximately 130° of rotation of the twister delay pinion 92. As the wire holding discs continue to turn, the tail portion 69 of the wire is forced into the slot 96 in the split pinion 95. This action causes the needle wire 73 to be forced under the keeper blade 122 and into the slot 96 in the split pinion. The wire holding discs stop rotating and hold the wires in this position while the twist is being made. As the wire holding discs stop rotating at approximately 160° of rotation of the twister delay gear 82 the twister delay pinion 92 again begins rotating. This forms the inline twist with the three wires that have been placed in the slot 96 in the split pinion 95. Up to this point the end abutting aligned shafts 68 have held the wire loop as shown in FIGURES 15, 16 and 17 because the shafts 106 and 109 were in the relative position as shown in FIGURE 9. It should be understood that even though the cooperative elements 106 and 109 and 106 and 110 are shown spaced apart in FIGURE 8 the normal and usual position of the elements is closed as shown in FIGURE 9. At approximately 290° of rotation of the twister delay gear 82 the shaft 106 commences to be rotated by the chain and sprocket drive as shown in FIGURE 5. This action causes the beveled or tapered ends of the end abutting aligned shafts to move to the position such as shown in FIGURES 6 and 18, wherein the loops in the inline twists are free to move through the diagonal slots 117 and 118 to thereby follow movement of the bale of hay. At approximately 330° of rotation of the twister delay gear 82 the twist is completely removed from the aligned abutting shafts and the wire holding discs 120 and 121 are rotated 30° causing the knife 126 by its forward cutting edge 127 to shear the needle wire 73. A trip dog (see Bornzin Patent 2,634,840) of the clutch 34 contacts the clutch trip arm 40 at 360° of rotation and completes the twisting cycle. As the tied bale is forced out of the bale chamber it strips the incline twist from the split pinion 95.

In order to better visualize the tying operation of the bale encircling strands of this invention in the successive positions of the portions of the wire strands relative to the wire holding and moving discs 66, the split pinion gear 95 and the end abutting aligned tapered end shafts 68 have been shown in a series of perspective views in FIGURES 13 through 18. For convenience in understanding, the detailed portions of the wire strand to be twisted will be given new reference numerals.

As shown in FIGURE 13, a wire strand portion 129 is held in the holding discs 66 by reason of the keeper blade 122 similar to the holding of a wire strand in FIGURE 10 by this holder 66. The wire strand 129 projects forwardly over the end abutting aligned shafts 68 in their position as shown in FIGURE 9 wherein a wire may not pass between the end abutment of the shafts. The portion 130 of the wire strand passes rearwardly through the downwardly opening slot 96 of the split pinion 95. As a further explanation of the rotation or journal mounting of the split pinion 95 within the housing 97 the pinion includes smooth surfaced annular discs 131 and 132 which flank both sides of the split pinion 95 and are of substantially identical diameter with the outer diameter of the pinion 95. The smooth surfaced discs 131 and 132, but for the notch 96, which not only passes through the central gear portion but also through the flanking discs, are the means for smoothly journaling the split pinion within the housing 97.

As best shown in FIGURE 14, the succeeding step in effecting a wire twist is the movement of a wire carrying needle 57 upwardly and over the twister elements. The split pinion 95 has its slot 96 turned upwardly such that it has received the wire strand portions 129 and 130 and is in position to receive a newly delivered strand 133 from the needle 57.

The next step in the wire twisting operation is to cause the wire strand 133 on the underside of the needle 57 to be pulled downwardly into the upwardly opening split pinion slot 96 by the notched wire holders 66. An outwardly projecting finger 134 adjacent the deep notch 125 forces the wire strand 133 down into the upwardly opening split pinion.

FIGURE 16 shows the needle 57 being retracted, laying its top strand 135 over the top of the wire holding discs 66 and spaced upwardly from the split pinion 95 and thence over the top of the shaft 106. The split pinion 95 has commenced to rotate in the direction of the arrow 136, as shown in FIGURE 6.

FIGURE 17 shows the succeeding step in the operation wherein the split pinion has rotated, effecting an intertwisting of the several strands within the slot 96 and causing a loop to be formed about the aligned and abutting shafts 68.

FIGURE 18 shows the final stage of the wire twisting operation wherein the twist has been completely formed by several revolutions of the split pinion 95 and the loop 136 formed in the twisted wire strands about the aligned end abutting shafts 68 is released from the end abutting aligned shafts by reason of the relative rotation of the shaft 106 with respect to the end shaft 109, thereby creating a diagonal passage or opening 117 through which the loop 136 may easily pass to thereupon follow the bale which has been tied and is now ready for ejection. In the transition from the device as shown in FIGURE 18 to the starting position as shown in FIGURE 13, the new strand 135 is anchored within the wire holder 66 and severed by the knife 126 from the previously made twist 137. The new wire so gripped by the wire holder passes down through the bale chamber to the source of wire supply, whereupon a reciprocating plunger pushing hay against this wire causes the wire strand to be extended around the three sides of the bale and at the time of tying the needle brings the strand upwardly to completely encircle the bale as it crosses the bale chamber from bottom to top and joins the end of the strand in with the previously gripped strand as explained in the several steps of the operation as shown in FIGURES 13 through 18, inclusive.

The wire holding and releasing mechanism defined in FIGURES 1 through 18 and identified by the numeral 68 included end abutting aligned shafts such as shown at 106 and 109 and 106 and 110. The invention herein is broadly intended to encompass a wire holding and releasing mechanism consisting of cooperative elements which in one position of relationship act to hold a wire strand or a looped wire strand and in another position of relationship act to release a wire strand or looped strand. In the device of FIGURES 1 through 18 the end abutting aligned shafts are beveled at one side of each end so that upon rotation of at least one of the cooperative shafts the beveled or tapered ends assume a relationship whereby there is provided a passage for the release of a wire strand previously held by these same cooperative shafts. However, the inventive concept of the wire holder and releaser mechanism is broader than end abutting aligned shafts in which one shaft may be rotated relative to the other to permit release of a previously held wire strand.

Figure 19:
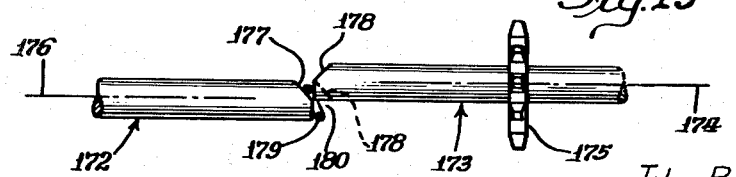
FIGURE 19 is a detail of a top view of the modified form of wire holding and releasing mechanism forming the subject of this divisional application.

The modified device of the wire holding and releasing mechanism shown in FIGURE 19 includes cooperative elements 172 and 173. The element 172 is generally stationary while the element 173 may be rotated about its axis 174 by reason of actuation of a sprocket 175 which is affixed to the shaft-like element 173. Thus in the same manner as the shaft 106 is rotated in FIGURE 5 so also is the shaft element 173 rotated by reason of drive imparted to the sprocket 175. The axes of the cooperative elements 172 and 173 are not in alignment with one another. As shown in FIGURE 19 the axis 176 of the generally stationary element 172 is spaced forwardly from the axis 174 of the element 173. The element 172 has a beveled or tapered end 177 at one side of the end thereof while the element 173 has a similarly beveled or tapered end at one side at 178. In the full line position of the elements of FIGURE 19 a wire loop 179 is clearly held by the cooperative elements 172 and 173. In the rotated position of the one element 173 its beveled end 178 has now assumed the position as shown in dash lines in FIGURE 19 thereby providing a diagonally positioned passageway 180 through which the wire loop 179 may freely pass. In this situation the cooperative elements 172 and 173 are generally end abutting in one position thereof and yet in a rotated position the cutoff at one side of the end of the element cooperates with a similar cutoff of one side of the end of the cooperative element such that upon rotation a passage for the release and ultimate stripping of the retained loop of wire has been made as indicated at 180.

It will thus be seen that the wire holding and releasing mechanism of this invention may take various forms and including various types of movement of at least one of the cooperative elements with respect to the other of the cooperative elements and thereby create a space between the elements for the natural stripping of a loop of wire therefrom.

We are aware that numerous details of construction may be varied throughout a wide range without departing from the principles disclosed herein and we therefore do not propose limiting the patent granted hereon otherwise as necessitated by the appended claims.

What is claimed is:

1. In a wire twister mechanism including a wire holder assembly for gripping wire strands and a wire twister assembly for twisting said wire strands, a wire holding and releasing means for supporting said wire strands comprising: a first, fixed member having a longitudinal axis, a second rotary member having a longitudinal axis laterally spaced from said axis of said first member, said first and said second members being in close end-to-end relation with each other, the end of said second member adjacent said first member having an intact portion and a cut-away portion, said second member being rotatable about its longitudinal axis to a first position, where said intact portion is adjacent said first member and to a second position where said cut-away portion is adjacent said first member, and actuating means associated with said second member for effecting rotation thereof from said first position to said second position on completion of the twisting of said wire strands by said wire twister.

2. A wire holding and releasing means as recited in claim 1, wherein: the axes of said first and said second members are parallel and have a common orientation, and said cut-away portion is a taper section on the end of said second member.

3. A wire holding and releasing means as recited in claim 1, wherein: said actuating means comprises a sprocket on said second member, a drive chain engaging said sprocket, and drive means associated with said chain for rotating said second member in timed relation with said holder assembly and said twister assembly.

4. A wire twister mechanism for a baler having a bale forming chamber, comprising: a wire holder for gripping a strand of wire, said wire holder having a wire-receiving face for wire extending thereto along a path from said bale forming chamber, a wire twister unit for twisting wire strands, said wire twister unit being located along said wire path opposite said face of said wire holder, a wire holder and release means located along said wire path beyond said wire twister unit, said wire holder and release means including a fixed element located adjacent said wire path and having an axis transverse to said wire path, a movable element located adjacent said wire path and having an axis transverse to said wire path, said movable element having a wire-holding portion movable along said wire path relative to said fixed element from a first position where said fixed element and said wire holding portion are in close, wire-holding relation to one another and said axes are non-aligned, to a second position where said fixed element and said wire-holding portion are in separated, wire-releasing relation to one another and said axes are non-aligned, and actuating means connected to said movable element for movement of said wire-holding portion from said first position to said second position in the final phases of a wire-twisting cycle.

References Cited by the Examiner

UNITED STATES PATENTS

| | | | |
|---|---|---|---|
| 2,450,082 | 9/1948 | Crumb et al. | 100—21 X |
| 2,548,559 | 4/1951 | Ronning et al. | 100—21 X |
| 2,634,840 | 4/1953 | Bornzin | 100—4 X |
| 2,733,652 | 2/1956 | Dwyer | 100—4 |
| 3,005,400 | 10/1961 | Bornzin | 100—21 |

WALTER A. SCHEEL, *Primary Examiner.*

LOUIS O. MAASSEL, *Examiner.*